United States Patent [19]

Matsushita et al.

[11] Patent Number: 4,931,836
[45] Date of Patent: Jun. 5, 1990

[54] SCANNING OPTICAL DEVICE HAVING AT LEAST ONE RECIPROCATING OPTICAL ASSEMBLY

[75] Inventors: Tetsuya Matsushita, Nagasaki; Akira Nakakuma, Takaishi, both of Japan

[73] Assignee: Mita Industrial Co., Ltd., Osaka, Japan

[21] Appl. No.: 213,288

[22] Filed: Jun. 28, 1988

[30] Foreign Application Priority Data

Jun. 30, 1987 [JP] Japan .................................. 62-161284
Jul. 6, 1987 [JP] Japan .................................. 62-167052
Oct. 19, 1987 [JP] Japan .................................. 62-261791

[51] Int. Cl.$^5$ ........................ G03G 15/04; G03G 27/50
[52] U.S. Cl. ................................. 355/233; 355/235; 355/66
[58] Field of Search ............... 355/8, 3 R, 66, 233, 355/235, 236; 358/285; 188/65.1; 29/433

[56] References Cited

U.S. PATENT DOCUMENTS 4,401,384 8/1983 Abe ............................................ 355/8 X
4,862,218 8/1989 Tsunoda et al. ......................... 355/233 X

FOREIGN PATENT DOCUMENTS 60-32034 2/1985 Japan ........................................ 355/8

*Primary Examiner*—Joan H. Pendegrass
*Attorney, Agent, or Firm*—Wenderoth, Lind & Ponack

[57] ABSTRACT

The present invention relates to various improvements in a scanning optical device having a pair of supporting members spaced from each other in a width-wise direction and an optical element assembly mounted reciprocably on the pair of supporting means. According to one aspect of the invention, the optical element assembly includes a supporting frame having optical elements mounted on it and support portions to be supported by the pair of supporting members, and at least one of the support portions is mounted on the supporting frame such that its position can be freely adjusted. According to another aspect of the invention, the optical element assembly is reciprocated by a front and a rear power transmission mechanism, and the front and rear power transmission mechanisms and a common driving source are disposed between a front and a rear upstanding base plate in which the pair of supporting members are provided. According to still another aspect of the invention, the front and rear power transmission mechanisms each include an input wire drum drivingly connected to the common driving source, and a wire for moving the optical element assembly is wrapped around the input wire drum through a plurality of turns. According to a further aspect of the invention, a notch for facilitating provisional wire anchorage is provided, and at the time of wire wrapping, the wire is provisionally anchored at the notch.

16 Claims, 9 Drawing Sheets

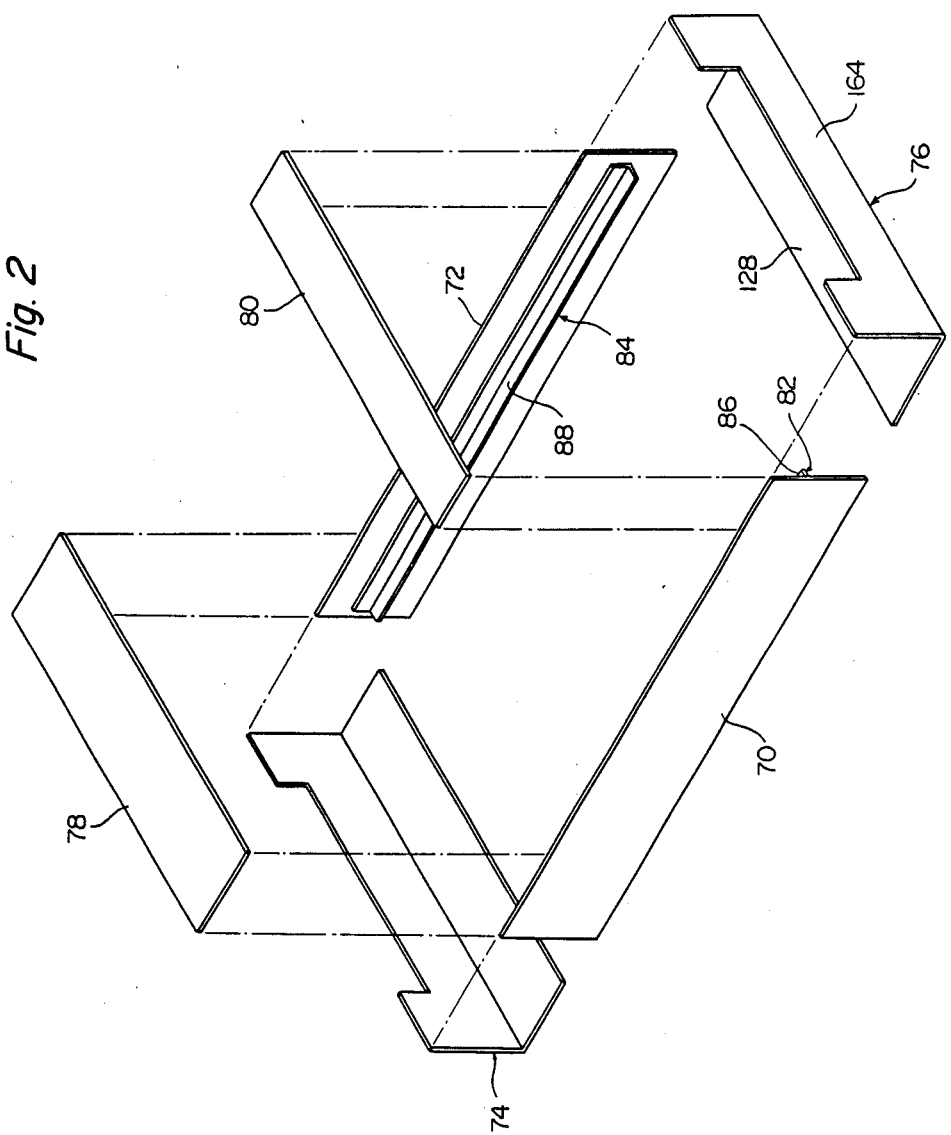

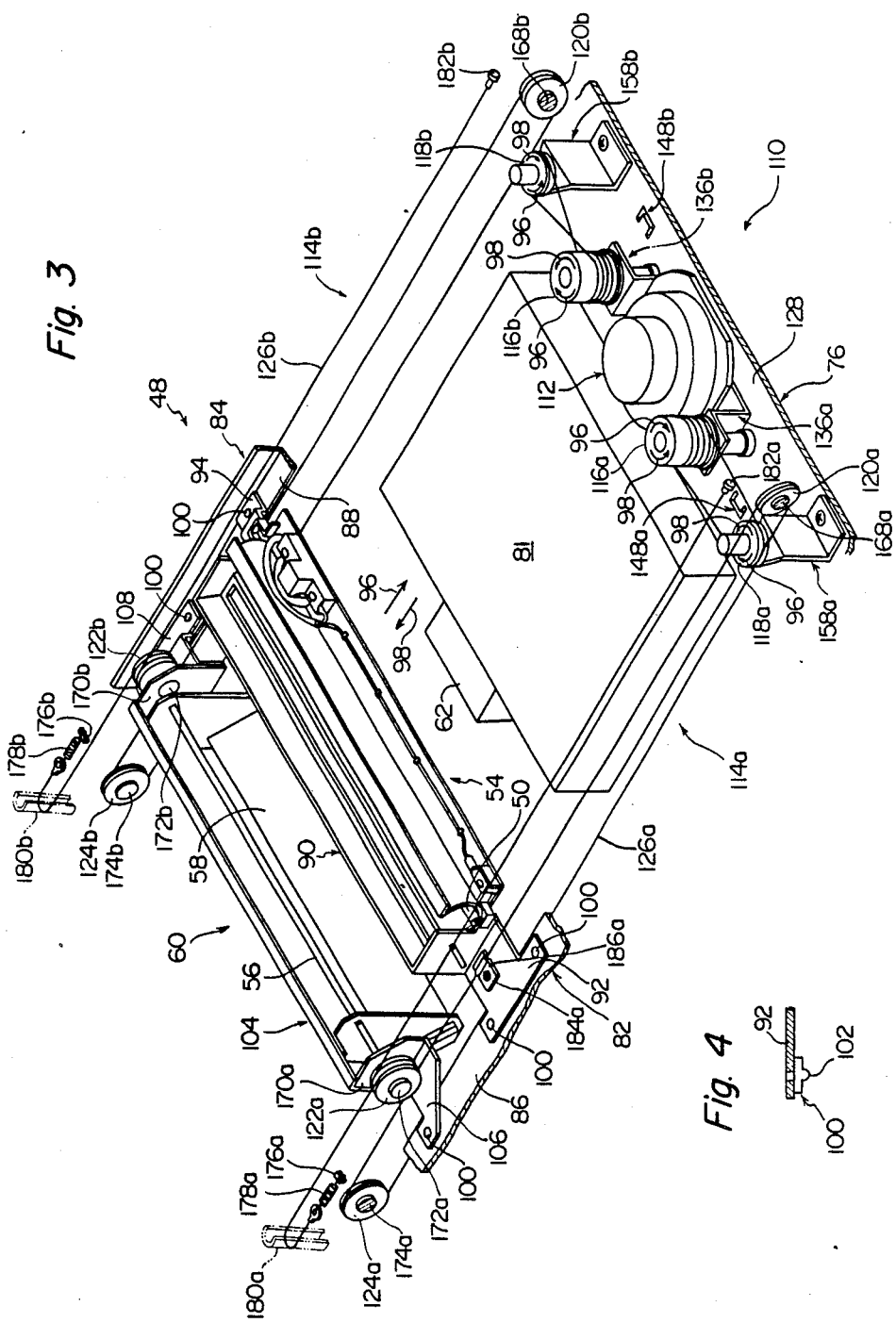

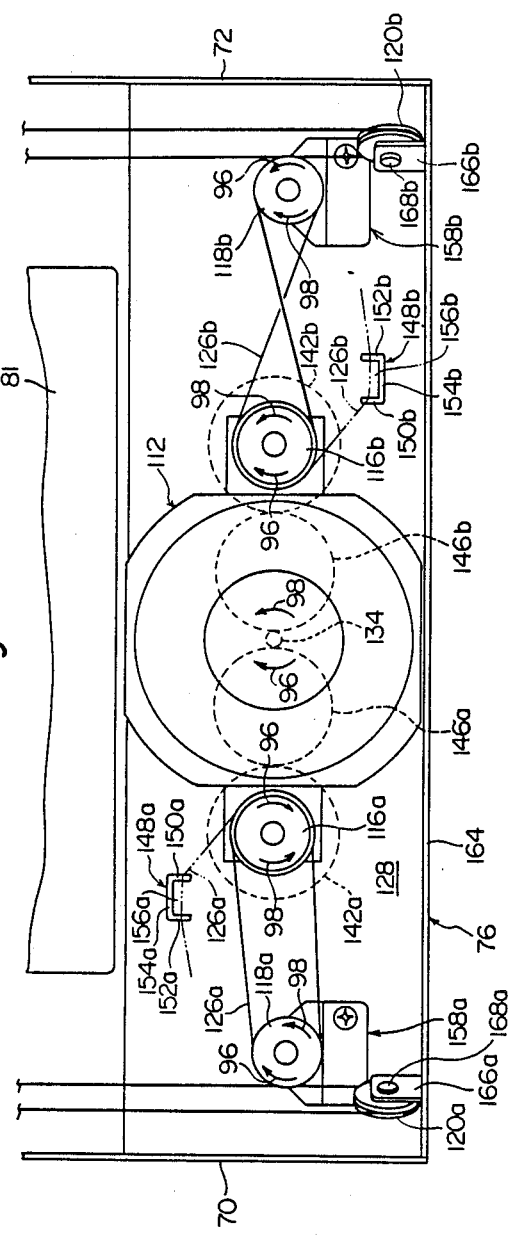
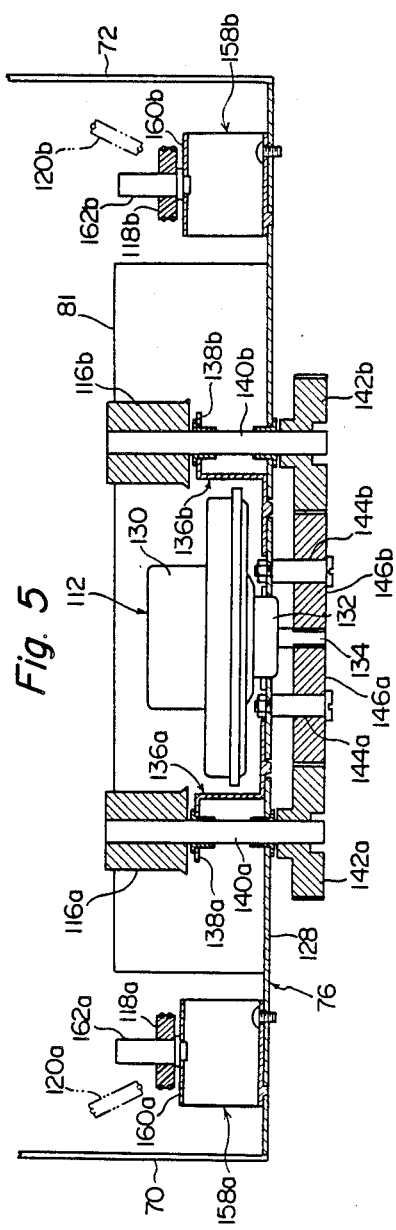

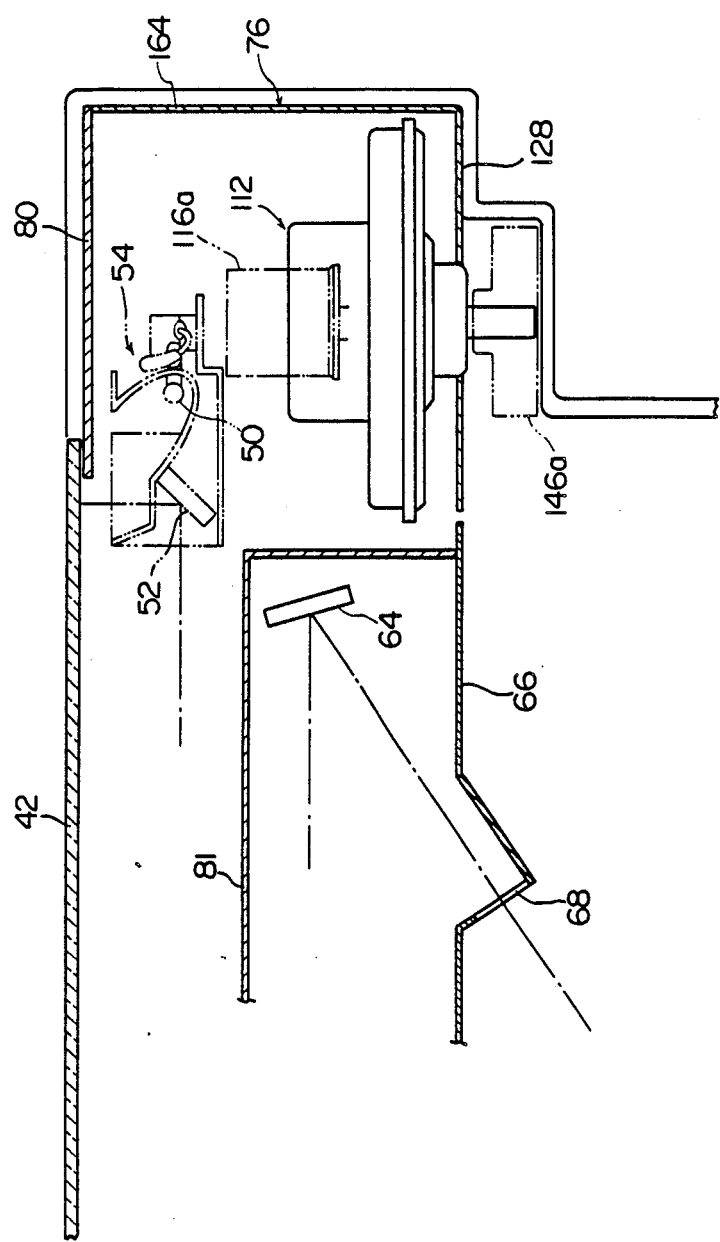

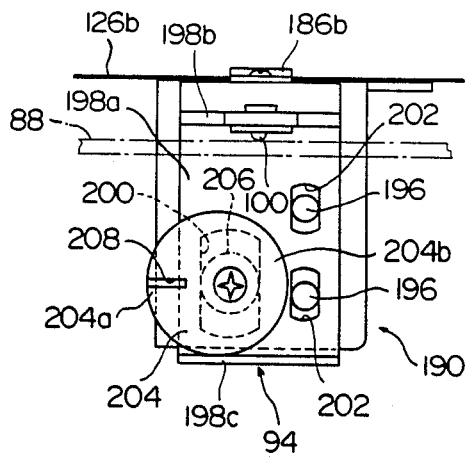
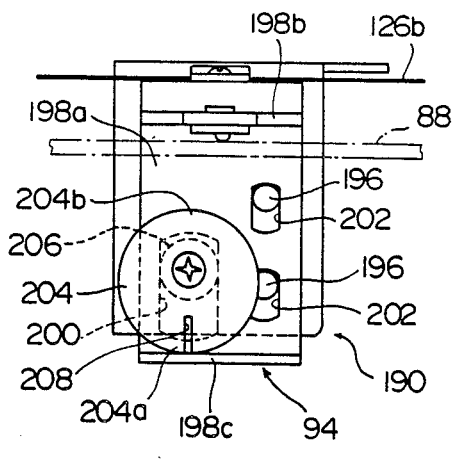
Fig. 10-A         Fig. 10-B
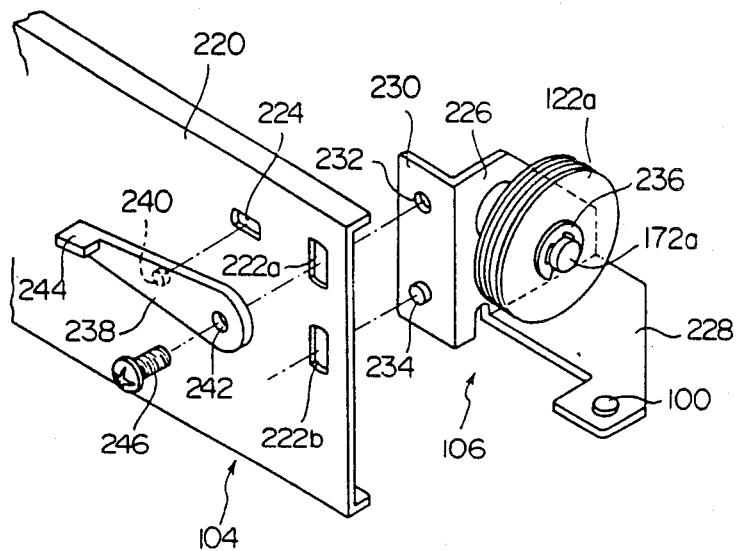
Fig. 11

SCANNING OPTICAL DEVICE HAVING AT LEAST ONE RECIPROCATING OPTICAL ASSEMBLY

Field of the Invention

This invention relates to a scanning optical device used in an image-forming machine such as an electrostatic copying machine or an image reader device such as a facsimile device for reading a transmitted document.

Description of the Prior Art

A typical example of the scanning optical device used in image-forming machines or image reader devices is a scanning optical device of the type disclosed in Japanese Laid-Open Patent Publication No. 95762/1983. This scanning optical device comprises a first optical element assembly and a second optical element assembly supported reciprocably on a pair of supporting rails, and driving means for reciprocating the two optical element assemblies.

Usually, the first optical element assembly has a document illuminating lamp and a first reflecting mirror, and the second optical element assembly has a second reflecting mirror and a third reflecting mirror. While the first optical element assembly is moved for scanning at a predetermined speed and the second optical element assembly is moved at a speed half of the above-mentioned speed, the light reflected from a document illuminated by the document illuminating lamp is projected via the first, second and third reflecting mirrors and other optical elements such as a stationary lens onto image receiving means which may be an electrophotographic plate or image pick-up means composed of many solid image pick-up elements such as CCD.

The driving means is comprised of a driving source and a power transmission mechanism drivingly connecting the driving source to the first and second optical element assemblies. The above-cited Japanese patent document discloses that to stabilize the reciprocating movement of the first and second optical element assemblies, it is desirable to drivingly connect the first and second optical element assemblies both at their front and rear sides to the driving source. Conveniently, therefore, the power transmission mechanism includes a front power transmission mechanism drivingly connecting the front sides of the first and second optical element assemblies to the driving source and a rear power transmission mechanism drivingly connecting the rear sides of the first and second optical element assemblies to the driving source. The power transmission mechanisms themselves may be so-called wire wrapping-type transmission mechanisms including an input wire drum, pulleys and a wire.

The conventional scanning optical device, however, is subject to the following problems.

First, the scanning optical device usually has a front upstanding base plate and a rear upstanding base plate spaced from each other in the width-wise direction, and the first, and second optical element assemblies are reciprocally mounted between the front and rear upstanding base plates. In the conventional scanning optical device, at least a considerable portion of each of the front and rear power transmission mechanisms is disposed outside of the front or rear upstanding base plate (i.e., frontwardly of the front upstanding base plate or rearwardly of the rear upstanding base plate). Thus, the problems associated with the conventional scanning optical device are as follows:

(a) Various electrical accessories are mounted on the outside of the front and/or the rear upstanding base plate. Since the electrical accessories cover the pulleys and/or wires, they hamper the wire wrapping operation at the time of assembling or repair, thus making this operation considerably difficult.

(b) Openings through which the front end portions and the rear end portions of the first and second optical element assemblies extend must be formed in the front and rear upstanding base plates in the moving direction of these assemblies. It is not simple enough, therefore, to work the front and rear upstanding base plates.

Secondly, the so-called wire wrapping-type power transmission mechanism must contain pulleys and a wire as well as an input wire drum around which the wire is wrapped through a plurality of turns, for example 10 turns. In the conventional scanning optical device, a single common input wire drum is provided both for the front transmission mechanism connecting the driving source to the front sides of the first and second optical element assemblies and for the rear power transmission mechanism for drivingly connecting the driving source to the rear sides of the first and second optical element assemblies. Hence, further problems with the conventional scanning optical device are as follows:

(a) Desirably, for the ease of the wire wrapping operation, the input wire drum is disposed in such a manner that its axis of rotation extends nearly vertically. The common input wire drum should have a height for wrapping the wire of the front power transmission mechanism through a plurality of turns plus a height for wrapping the wire of the rear power transmission mechanism through a plurality of turns, and its total required height is excessively larger than the required heights of other constituent elements of the power transmission mechanisms. Accordingly, the height of the common input wire drum requires an otherwise unused space in the scanning optical device, and prevents the device from being compact.

(b) One of the wires of the front power transmission mechanism and the rear power transmission mechanism is wrapped around the lower half of the common input wire drum and the other, around its upper half. Hence, the front power transmission mechanism and the rear power transmission mechanism are at least partly arranged deviating from each other in the vertical direction, and at least some imbalance is created between the power transmission of the front power transmission mechanism and that of the rear power transmission mechanism.

Thirdly, at the time of assembling or repair, the following wire wrapping operation should be carried out in the wire wrapping-type power transmission mechanism. One end of a wire is fixed at a predetermined point, and then wrapped around one or more pulleys. The wire is wrapped around the input wire drum through a plurality of turns and further wrapped around one or more pulleys, and finally, the other end of the wire is fixed at a predetermined point. After the wire has been wrapped around the input wire drum through a plurality of turns, the remainder of the wire should be wrapped while that portion of the wire which has been wrapped around the input wire drum is prevented from loosening and coming off of the drum in the axial direction. In the prior art, this is accomplished by holding the downstream part of the wire around the input wire drum with one hand so as to prevent loosening and at the same time, wrapping the remainder of the wire with the other hand; or by holding the downstream part of the wire around the input wire drum with a special jig so as to prevent loosening and then wrapping the remainder of the wire. It will be easily appreciated that this conventional operation of wire wrapping is not easy and efficient, and may inadvertently result in the removal of the so wrapped wire from the drum.

Fourthly, in the scanning optical device of this type, the vertical positions of optical elements such as reflecting mirrors are generally adjusted by changing the relative positions of support portions provided in the first and/or second optical element assembly and supporting rails slidably supporting the support portions. The optical element assemblies are provided with a supporting frame on which the optical elements are mounted, and the support portions are provided on both end portions of the supporting frame (for example, as a one-piece unit or by means of a fixing screw). Power transmission means such as a power transmission wire for moving the optical element assemblies is connected to the support portions so provided. Accordingly, it will be easily understood that when the relative positions of the support portions and the supporting rails are changed in order to adjust the vertical positions of the optical elements, the connecting position of the power transmission wire at the support portions is also changed vertically. Particularly, in a scanning optical device of the type in which one end of the power transmission wire connected to the support portion is directly connected to the other optical element assembly, when the connecting position of the power transmission wire moves upwardly as a result of adjusting the relative positions of the support portions and the supporting rails, this upward movement of the wire connecting position tends to cause the other optical element assembly to move upwardly, as will be described in detail later on. If this tendency increases, the other optical element assembly cannot be moved smoothly. Consequently, vibration occurs during the scanning movement, and the document cannot be scanned and exposed properly.

SUMMARY OF THE INVENTION

It is a first object of this invention to provide an improved scanning optical device in which the vertical positions of optical elements can be adjusted without substantially changing the relative positions of a support portion in an optical element assembly and means for supporting the optical element assembly.

A second object of this invention is to provide an improved scanning optical device in which a wire wrapping operation is not hampered by electrical accessories mounted on the outside of a front upstanding base plate and/or a rear upstanding base plate, and the need to form openings in the front and/or rear upstanding base plate in the moving direction of a first and a second optical element assembly is obviated.

A third object of this invention is to provide an improved scanning optical device which does not require an element having an excessively large height as compared with other constituent elements, and in which no imbalance substantially exists between a front power transmission mechanism and a rear power transmission mechanism.

A fourth object of this invention is to provide an improved scanning optical device in which loosening of a wire wrapped around an input wire drum through a plurality of turns can be accurately prevented by a very simple operation without the need for holding the wire with one hand or with a special jig, and therefore, the wire wrapping operation can be carried out with increased ease and efficiency.

Other objects of this invention will become apparent from the following description.

BRIEF DESCRIPTION OF THE DRAWINGS

FIG. 2 is a simplified exploded perspective view showing a supporting frame structure in the scanning optical device provided in the electrostatic copying machine shown in FIG. 1;

FIG. 3 is a perspective view showing the principal parts of the scanning optical device in the electrostatic copying machine shown in FIG. 1;

FIG. 4 is a partial sectional view showing a sliding piece in the scanning optical device shown in FIG. 3;

FIG. 5 is a sectional view showing part of the scanning optical device in the electrostatic copying machine shown in FIG. 1;

FIG. 6 is a top plan view showing part of the scanning optical device in the electrostatic copying machine shown in FIG. 1;

FIG. 7 is a sectional view showing part of the scanning optical device in the electrostatic copying machine shown in FIG. 1;

FIGS. 10-A and 10-B are diagrams illustrating the adjustment of the position of a supporting frame in the first optical element assembly shown in FIG. 8;

FIG. 11 is an exploded perspective view of one end portion of a second optical element assembly in the scanning optical device shown in FIG. 3;

DETAILED DESCRIPTIONS OF THE PREFERRED EMBODIMENTS

The invention will now be described in detail with reference to the accompanying drawings.

Figure 1:
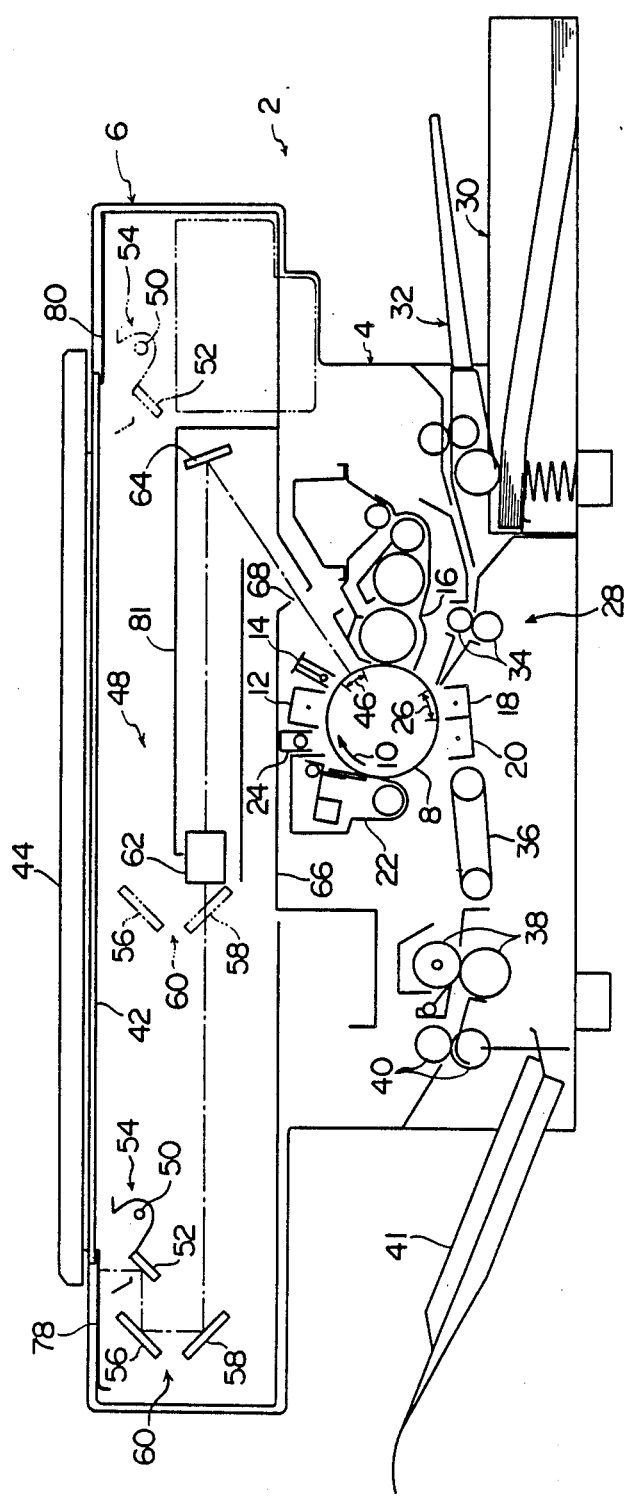
FIG. 1 is a simplified sectional view showing an electrostatic copying machine provided with one embodiment of the scanning optical device of this invention.

FIG. 1 illustrates, in a simplified form, an electrostatic copying machine provided with one embodiment of the scanning optical device of this invention. The electrostatic copying machine has a housing shown generally at 2. The housing 2 has a nearly rectangular lower portion 4 and a nearly rectangular elongate upper portion 6 which projects beyond the lower portion 4 at its left and right sides. A rotating drum 8 having an electrophotographic material on its surface is rotatably disposed within the lower portion 4. Around the rotating drum 8 are sequentially arranged a charging corona discharger 12, a selective charge eliminating lamp assembly 14, a developing device 16, a transferring corona discharger 18, a peeling corona discharger 20, a cleaning blade assembly 22 and a charge eliminating lamp assembly 24 as viewed in the drum rotating direction shown by an arrow 10. Copying paper conveying means shown generally at 28 are also provided in the lower portion 4 so as to convey a copying sheet, which may be plain paper, through a transfer zone 26 in which the surface of the rotating drum 8 faces the transferring corona discharge 18. The paper conveying means 28 comprises cassette-type paper feed means 30 disposed at its right end, hand insertion-type paper feed means 32 disposed above the cassette-type paper feed means 30, a pair of resist rollers 34 disposed upstream of the transfer zone 26, a conveyor belt mechanism 36 disposed downstream of the transfer zone 26, a pair of fixing rollers 38 and a pair of discharge rollers 40 disposed downstream of the conveying belt mechanism 36, and a receiving tray 41 disposed at the left side end.

A transparent plate 42 on which to place a document to be copied and an openable and closable document cover 44 for covering the document on the transparent plate 42 are provided on the upper surface of the upper portion 6 of the housing 2. A scanning optical device shown generally at 48 is disposed within the upper portion 6 of the housing 2 for scanning the document on the transparent plate 42 and for projecting an image corresponding to the document onto the rotating drum 8 in an exposure zone shown at 46. The scanning optical device 48 includes a first optical element assembly 54 comprising a document illuminating lamp 50 and a first reflecting mirror 52, a second optical element assembly 60 comprising a second reflecting mirror 56, a third reflecting mirror 58, a lens assembly 62 and a stationary reflecting mirror 64. The first optical element assembly 54 reciprocates between a position shown by a solid line and a position shown by a two-dot chain line, and the second optical element assembly 60 reciprocates between a position shown by a solid line and a position shown by a two-dot chain line at a speed half of the moving speed of the first optical element assembly 54, as will be described in detail hereafter.

In the electrostatic copying machine described, while the rotating drum 8 is continuously rotated in a direction shown by the arrow 10, the charging corona discharger 12 uniformly charges the surface of the rotating drum 8 to a specific polarity. Then, a plurality of lamps of the selective charge eliminating lamp assembly 14 which are disposed in the width-wise direction (the direction perpendicular to the sheet surface in FIG. 1) are selectively energized in correspondence with a width of the document (or copying paper) to erase the charge on a non-used area defined along one or both side portions of the surface of the rotating drum 8. Then, in the exposure zone 46, the image of the document placed on the transparent plate 42 is exposed and projected onto the surface of the rotating drum 8 by the scanning optical device 48. As a result, a latent electrostatic image corresponding to the document is formed on the surface of the rotating drum 8.

At the time of the exposure mentioned above, the first optical element assembly 54 is moved from a start-of-scan position shown by the solid line to the right at a predetermined speed, and the second optical element assembly 60, from a start-of-scan position shown by the solid line to the right at a speed half of the above predetermined speed, in the scanning optical device 48. Consequently, the document placed on the transparent plate 42 is scanned, and the light reflected from the document illuminated by the document illuminating lamp 50 is projected onto the surface of the rotating drum 8 via the first reflecting mirror 52, the second reflecting mirror 56, the third reflecting mirror 58, the lens assembly 62 and the stationary reflecting mirror 64. As shown in FIG. 1, a partitioning plate 66 is disposed within the housing 2 to partition it partially into the lower portion 4 and the upper portion 6. An opening 68 is formed in the inclined part of the partitioning plate 66, and the reflecting light from the stationary reflecting mirror 64 passes through this opening 68 and arrives at the surface of the rotating drum 8.

The latent electrostatic image on the rotating drum 8 is developed to a toner image by the developing device 16. A copying paper sheet fed from the paper feed means 30 or 32 is brought into intimate contact with the surface of the rotating drum 8 in the transfer zone 26, and under the action of the transferring corona discharge 18, the toner image on the drum 8 is transferred to the copying paper sheet. The copying paper sheet bearing the toner image is peeled from the rotating drum 8 under the action of the peeling corona discharger 20, and as it passes between the pair of fixing rollers 38, the toner image is fixed. Subsequently, the paper is discharged onto the receiving tray 41. In the meantime, the rotating drum 8 continues to rotate, and the toner remaining on it is removed by the cleaning blade assembly 22, and the charge eliminating lamp assembly 24 erases the residual charge on the rotating drum 8.

Since the described structure and operation of the illustrated electrostatic copying machine may be the same as those known to those skilled in the art, a detailed description thereof will be omitted in the present specification.

Now, with reference to FIG. 2 as well as FIG. 1, a front upstanding base plate 70 and a rear upstanding base plate 72 spaced from each other in the width-wise direction (direction perpendicular to the sheet surface in FIG. 1) are disposed within the upper portion 6 of the housing 2. Supporting plates 74 and 76 having an L-shaped cross section are fixed, respectively, to both ends of the base plates 70 and 72 by a suitable means. Likewise, supporting plates 78 and 80 are respectively fixed to the upper sides of both end portions of the base plates 70 and 72 by a suitable means. As can be seen from FIG. 1, the transparent plate 42 is fixed to the supporting plates 78 and 80 by a suitable means. The partitioning plate 66 (FIG. 1) is also fixed to the base plates 70 and 72 although this is not shown in FIG. 2. A cover plate 81 covering the stationary reflecting mirror 64 and part of the lens assembly 62 is fixed to the partitioning plate 66 (FIG. 1). Guiding members 82 and 84 having an L-shaped cross section are fixed by a suitable means to the inside surfaces of the upstanding base plates 70 and 72 respectively. Each of the guiding members 82 and 84 constituting supporting means have substantially horizontally extending guiding rails 86 and 88 (see both FIGS. 2 and 3). Various electrical accessories such as a circuit base board and a connecting plug assembly are mounted on the outside surfaces of the front and rear upstanding base plates 70 and 72 although not shown.

Figure 8:
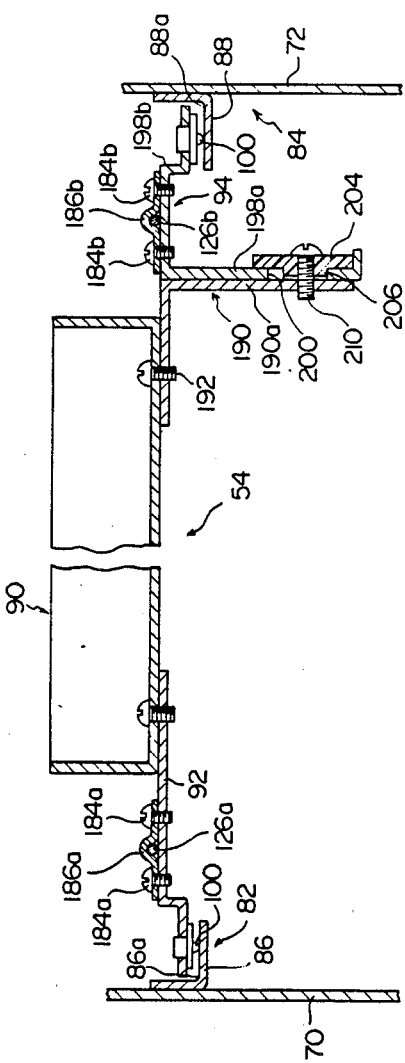
FIG. 8 is a sectional view showing a first optical element assembly and its location in the scanning optical device shown in FIG. 3.

With reference to FIG. 3, the first optical element assembly 54 and the second optical element assembly 60 in the scanning optical device 48 are slidably mounted on the guiding rails 86 and 88 of the guiding members 82 and 84. The first optical element assembly 54 has a supporting frame 90 to which the document illuminating lamp 50 and the first reflecting mirror 52 (FIG. 1) are fixed. A nearly T-shaped forwardly projecting piece 92 (constituting one support portion) is provided on the front side of the supporting frame 90, and a rearwardly projecting support member 94 (constituting another support portion) is provided on the rear side of the supporting frame 90. Two sliding pieces 100 spaced from each other in the moving direction (shown by arrows 96 and 98) of the first optical element assembly 54 are fixed to the projecting piece 92, and one sliding piece 100, to the support member 94. As can be understood from FIG. 4 that the sliding piece 100 has a downwardly projecting hemispherical protrusion 102. Conventiently, the sliding piece 100 is formed from a synthetic resin having high abrasion resistance and a low coefficient of friction, such as a synthetic resin commercially available under the tradename "Rulon". As can be understood from FIGS. 3 and 4, the first optical element assembly 54 is mounted on the guiding rails 86 and 88 so as to slide therealong with the protrusions 102 of the two sliding pieces 100 provided at the front side of the assembly 54 contacting the upper surface of a rail portion 86a of the guiding rail 86 and the protrusion 102 of the sliding piece 100 provided at the rear side of the assembly 54 contacting a rail portion 88a of the guiding rail 88 (FIG. 8). Likewise, the second optical element assembly 60 has a supporting frame 104 to which the second reflecting mirror 56 and the third reflecting mirror 58 are fixed. A forwardly projecting support member 106 (constituting a support portion) is provided on the front side of the supporting frame 104, and a rearwardly projecting nearly T-shaped projecting piece 108 (constituting another support portion) is provided on the rear side of the supporting frame 104. One sliding piece 100 is fixed to the support member 106, and two sliding pieces 100 (only one of which is shown in FIG. 3) spaced from each in the moving direction (shown by arrows 96 and 98) of the second optical element assembly 60 are fixed to the projecting piece 108. These sliding pieces 100 may be the same as the sliding pieces 100 of the first optical element assembly 54 and each have a downwardly projecting hemispherical protrusion 102 similar to that shown in (FIG. 4). Thus, the second optical element assembly 60 is mounted on the guiding rails 86 and 88 so as to slide therealong with the protrusion 102 of the sliding piece 100 provided at the front side contacting the upper surface of a rail portion 86a of the guiding rail 86 and contacting the protrusions 102 of the two sliding pieces 100 provided at the rear side of the assembly 60 contacting a rail portion 88a in the guiding rail 88.

Furthermore, with reference to FIG. 3, the scanning optical device 48 is provided with driving means shown generally at 110 for reciprocating the first optical element assembly 54 and the second optical element assembly 60 as described above. The driving means 110 includes one common driving source 112 which may be an electric motor, a front power transmission mechanism 114a and a rear power transmission mechanism 114b. The front power transmission mechanism 114a comprises an input wire drum 116a, pulleys 118a, 120a, 122a and 124a and a wire 126a, and drivingly connects the front sides of the first and second optical element assemblies 54 and 60 to the common driving source 112. The rear power transmission mechanism 114b includes an input drum 116b, pulleys 118b, 120b, 122b and 124b, and a wire 126b, and drivingly connects the rear sides of the first and second optical element assemblies 54 and 60 to the common driving source 112.

With reference to FIGS. 5 to 7, and particularly FIG. 5, in conjunction with FIG. 3, the supporting plate 76 (see FIG. 2 also) has a horizontal portion 128 and the common driving source 112 is mounted centrally on the horizontal portion 128 in its width-wise direction (the left-right direction in FIGS. 5 and 6). The common driving source 112 is comprised of an electric motor having a casing 130, and the cylindrical lower end portion 132 of the casing 130 is fixed to the horizontal portion 128 of the supporting plate 76 by a suitable means. The rotating output shaft 134 of the common driving source 112 projects downwardly substantially vertically from the casing 130. Securing bracket pieces 136a and 136b positioned symmetrically with respect to the front side and the rear side of the common driving source 112 are also fixed to the horizontal portion 128 of the supporting plate 76. The bracket pieces 136a and 136b have securing parts 138a and 138b extending substantially horizontally above the horizontal portion 128. A rotating shaft 140a is rotatably mounted extending substantially vertically through the securing portion 138a of the bracket piece 136a and the horizontal portion 128 of the supporting plate 76, and a rotating shaft 140b is rotatably mounted extending substantially vertically through the securing portion 138b of the bracket piece 136b and the horizontal portion 128 of the supporting plate 76. The input wire drums 116a and 116b are fixed respectively to the upper end portions of the rotating shafts 140a and 140b which project upwardly beyond the securing portions 138a and 138b of the bracket pieces 136a and 136b. Gears 142a and 142b are fixed, respectively, to the lower end portions of the rotating shafts 140a and 140b which project downwardly beyond the horizontal portion 128 of the supporting plate 76. To the horizontal portion 128 are fixed the upper end of a short rod 144a positioned between the common driving source 112 and the rotating shaft 140a and the upper end of a short rod 144b positioned between the common driving source 112 and the rotating shaft 140b. Gears 146a and 146b are rotatably mounted respectively, to the lower ends of the substantially vertically extending short rods 144a and 144b. Teeth are formed in the rotating output shaft 134 of the common driving source 112. The gear 146a meshes with both the rotating output shaft 134 and the gear 142a, and the gear 146a meshes with both the rotating output shaft 134 and the gear 142b. Consequently, the input wire drum 116a of the front power transmission mechanism 114a is drivingly connected to the rotating output shaft 134 of the common driving source 112 via the gears 142a and 146a, and the input wire drum 116b of the rear power transmission mechanism 114b is drivingly connected to the rotating output shaft 134 of the common driving source 112 via the gears 142b and 146b.

As shown in FIGS. 3 and 6, notches 148a and 148b for provisionally anchoring the wires are formed in the horizontal portion 128 of the supporting plate 76. In FIG. 6, the notch 148a is disposed adjacent to, and above the left of, the input wire drum 116a, and has two parallel leg portions 150a and 152a and a connecting portion 154a connecting the upper end parts of the leg portions 150a and 152a. Between the two leg portions 150a and 152a is defined an anchoring projecting piece 156a extending toward the connecting portion 154a. Likewise, in FIG. 6, the notch 148b is disposed adjacent to, and below the right of, the input wire drum 116b, and has two parallel leg portions 150b and 152b and a connecting portion 154b connecting the lower end parts of the leg portions 150b and 152b, and an anchoring projecting piece 156b extending toward the connecting portion 154b is defined between the two leg portions 150b and 152b. The purpose and action of these notches 148a and 148b for facilitating the provisional wire anchorage will be described later on.

As clearly shown in FIGS. 3 and 5, securing bracket pieces 158a and 158b are also secured to the front end portion and rear end portion (the left end portion and the right end portion in FIG. 5) of the horizontal portion 128 of the supporting plate 76. These securing bracket pieces 158a and 158b respectively have securing portions 160a and 160b extending substantially horizontally above the horizontal portion 128. Short rods 162a and 162b projecting upwardly substantially vertically are fixed to the securing portions 160a and 160b, respectively, of the bracket pieces 158a and 158b. The pulley 118a of the front power transmission mechanism 114a and the pulley 118b of the rear power transmission mechanism 114b are rotatably mounted on the short rods 162a and 162b, respectively. The supporting plate 76 also has an upstanding portion 164 (see FIG. 2 also) projecting upwardly substantially vertically from one edge (the lower edge in FIG. 6) of the horizontal portion 128. As shown in FIG. 6, projecting pieces 166a and 166b extend inwardly from front end parts and rear end part (the left end part and right end part in FIG. 6) of the upstanding portion 164. Short rods 168a and 168b are fixed to the projecting pieces 166a and 166b. The pulley 120a of the front power transmission mechanism 114 and the pulley 120b of the rear power transmission mechanism 114b are rotatably mounted on the short rods 168a and 168b. As can be seen from FIGS. 3, 5 and 6, the short rod 168a (therefore the axis of rotation of the pulley 120a) is inclined downwardly in the forward direction, and the short rod 168b (and therefore the axis of rotation of the pulley 120b) is inclined downwardly in the rearward direction. As shown in FIG. 3, the supporting frame 104 of the second optical element assembly 60 has an upstanding front wall 170a and an upstanding rear wall 170b to which short rods 172a and 172b projecting forwardly and rearwardly substantially horizontally are fixed. The pulley 122a of the front power transmission mechanism 114a and the pulley 122b of the rear power transmission mechanism 114b are rotatably mounted on the short rods 172a and 172b, respectively. Furthermore, short rods 174a and 174b projecting rearwardly and forwardly substantially horizontally are fixedly secured to the front upstanding base plate 70 and the rear upstanding base plate 72 (FIG. 2). The pulley 124a of the front power transmission mechanism 114a and the pulley 124b of the rear power transmission mechanism 114b are rotatably mounted on the short rods 174a and 174b, respectively. The short rods 174a and 174b and the pulleys 124a and 124b mounted on them are positioned below the guiding members 82 and 84 fixed to the inside surfaces of the front upstanding base plate 70 and the rear upstanding base plate 72.

Again, with reference to FIG. 3, the wire 126a of the front power transmission mechanism 114a is wrapped about the input wire drum 116a and the pulleys 118a, 120a, 122a and 124a. Likewise, the wire 126b of the rear power transmission mechanism 114b is wrapped about the input wire drum 116b and the pulleys 118b, 120b, 122b and 124b. More specifically, the wire 126a of the front power transmission mechanism 114a is wrapped as follows: An anchoring piece 176a is fixed to the inside surface of one end portion (the left end portion in FIG. 1) of the front upstanding base plate 70 (FIG. 2), and one end of elastic means 178a, which may be a tension coil spring, is anchored at the anchoring piece 176a. The wrapping of the wire 126 can be started by fixing one end of the wire 126a to the other end of the elastic means 178a. Then, the wire 126a is wrapped along a guiding portion having an arcuate sectional shape formed in the upper end portion of the guiding plate 180a fixed at its lower end portion to the supporting plate 74. The wire 126a is wrapped around the pulley 122a over an angular range of about 180 degrees clockwise when viewed from ahead, then around the pulley 124a over an angular range of about 180 degrees when viewed counterclockwise from ahead, and further around the pulley 118a over an angular range of about 90 degrees when viewed counterclockwise from above. Then, the wire 126a is wound around the input wire drum 116a counterclockwise when viewed from above through a plurality of turns, for example about 10 turns, plus a half turn (i.e., over an angular range of $n \times 360 +$ about 180 degrees in which n is a positive integer) over a length corresponding to the reciprocating moving distances of the first optical element assembly 54 and the second optical element assembly 60. Then, before the wire 126a is further wrapped, it is provisionally anchored at the notch 148a. The provisional anchoring is achieved, as shown by a two-dot chain line in FIG. 6, by introducing the wire 126a extending from the input wire drum 116a into a site beneath the anchoring projecting piece 156a through the connecting portion 154a of the notch 148a and thus causing the wire 126a to advance from one leg portion 150a of the notch 148a, then below the anchoring projecting piece 156a and finally upwardly from the other leg portion 152a. As a result, the wire 126a extends around the anchoring projecting piece 156a and is accurately anchored provisionally due to the flexural rigidity of the wire 126a and the engagement of the wire 126a with the anchoring projecting piece 156a. Accordingly, in the subsequent wrapping operation of the wire 126a, the wire 126a once wrapped around the input wire drum 116a is ensuredly prevented from loosening accidentally and coming off upwardly from the wire drum 116a. After the provisional anchoring is carried out, the wire 126a is further wrapped around the pulley 118a over an angular range of about 90 degrees counterclockwise when viewed from ahead, and further around the pulley 122a over an angular range of about 180 degrees clockwise as viewed from ahead. Thereafter, the provisional anchoring of the wire 126a at the notch 148a is released, and the wire 126a is maintained sufficiently taut. A linking member 182a fixed to the other end of the wire 126a is linked by a suitable means to an anchoring bracket (not shown) fixed to the other end portion (the right end portion in FIG. 1) of the inside surface of the front upstanding base plate 70 (FIG. 2) the releasing of the provisional anchorage can be achieved by forcibly drawing the wire 126a upwardly from below the anchoring projecting piece 156a through the connecting portion 154a of the notch 148a.

Then, to ensuredly prevent the occurrence of slippage between the wire 126a and the input wire drum 116a, the wrapping starting end portion of the wire 126a is fixed to the input wire drum 116a by a set screw (not shown). Thereafter, a wire fixing piece 186a is fixed by a set screw 184a to the projecting piece 92 formed in the front side of the frame 90 of the first optical element assembly 54, and the wire 126a extending along the upper surface of the projecting piece 92 is firmly held by the projecting piece 92 and the fixing piece 185a. Thus, the wire 126a is fixed to the frame 90 of the first optical element assembly 54. This completes the wrapping of the wire 126a in the front power transmission mechanism 114a. This wire wrapping operation can be carried out by inserting one's hands between the front upstanding base plate 70 and the rear upstanding base plate 72 from above while the supporting plates 78 and 80 to be disposed on the upper surfaces of the front upstanding base plate 70 and the rear upstanding base plate 72 and the transparent plate 42 to be fixed thereto are still in the non-mounted state. The wrapping of the wire 126b in the rear power transmission mechanism 114b is substantially the same as the wrapping of the wire 126a in the front power transmission mechanism 114a described above. In the wire wrapping operation in the rear power transmission mechanism 114b, the wire 126b is wrapped around the pulley 118b over an angular range of about 90 degrees clockwise when viewed from above, and then wound around the input wire drum 116b counterclockwise when viewed from above through a plurality of turns, for example about 10 turns, plus a half turn (i.e., over an angular range of n×360+about 180 degrees, in which n is a positive integer). Then, the wire 126b is anchored provisionally at the notch 148b, and then wrapped around the pulley 118b over an angular range of about 90 degrees clockwise when viewed from above. Accordingly, when the provisional anchoring of the wire 126b is released and the wrapping of the wire 126b is completed, the wrapping of the wire 126b between the input wire drum 116b and the pulley 118b is not open but closed. The wire 126b is fixed to the frame 90 of the first optical element assembly 54 by fixing a wire fixing piece 186b with a set screw 184b to the support member 94 provided on the rear side of the frame 90 and firmly holding the wire 126b extending along the upper surface of the support member 94 with the support member 94 and the fixing piece 186b (see FIG. 8).

With reference to FIGS. 3 and 6, in the scanning optical device 48 described above, when the common driving source 112 is energized to rotate its rotating output shaft 134 in the direction of arrow 96, the input wire drums 116a and 116b are rotated in the direction of arrow 96 (namely, both the input wire drums 116a and 116b are rotated clockwise when viewed from above), and the pulleys 118a and 118b are also rotated in the direction of arrow 96 (namely, the pulley 118 is rotated clockwise when viewed from above, and the pulley 118b is rotated counterclockwise when viewed from above). As a result, in accordance with the principle of pulleys, the first optical element assembly 54 is moved for scanning at a predetermined speed in the direction of arrow 96, and the second optical element assembly 90 is moved for scanning at a speed half of the above-mentioned predetermined speed in the direction of arrow 96. When, on the other hand, the common driving source 112 is energized to rotate its rotating output shaft 134 in a direction opposite to the above-described direction, namely in the direction shown by an arrow 98, the input wire drums 116a and 116b are rotated in the direction of arrow 98 (namely, both the input wire drums 116a and 116b are rotated counterclockwise when viewed from above) and the pulleys 118a and 118b are also rotated in the direction of arrow 98 (namely, the pulley 118a is rotated counterclockwise when viewed from above, and the pulley 118b, clockwise when viewed from above). As a result, in accordance with the principle of pulleys, the first optical element assembly 54 is returned at a predetermined speed in the direction of arrow 98, and the second optical element assembly 60, at a speed half of the above-mentioned speed in the direction of arrow 98.

In the scanning optical device 48 having the above-described structure, the first optical element assembly 54, the second optical element assembly 60, and the driving means 110, more specifically the common driving source 112, almost all of the constituent elements of the front power transmission mechanism 114a and almost all of the constituent elements of the rear power transmission mechanism 114 are arranged between the front upstanding base plate 70 and the rear upstanding base plate 72 in the width-wise direction. Hence, electrical accessories (not shown) mounted on the outside surface of the front upstanding base plate 70 and/or the rear upstanding base plate 72 do not hamper the wrapping of the wires 126a and 126b. So long as the supporting plates 78 and 80 to be disposed on the upper surfaces of the base plates 70 and 72 and the transparent plate 42 to be fixed thereto are in the non-mounted state, it is easy to carry out the wrapping of the wire 126a in the front power transmission mechanism 114a and the wrapping of the wire 126b in the rear power transmission mechanism 114b by inserting one's hands between the base plates 70 and 72 from above. There is no need to form an opening extending in the directions of arrows 96 and 98 in FIG. 3 in the base plates 70 and 72, and therefore, the problems of the conventional scanning optical devices owing to such an opening can be circumvented.

In the scanning optical device 48, the input wire drums 116a and 116b are provided, respectively, in the front power transmission mechanism 114a and the rear power transmission mechanism 114b. Hence, as compared with using a single common wire drum for both the front power transmission mechanism 114a and the rear power transmission mechanism 114b, the vertical dimensions of the input wire drums 116a and 116b can be decreased nearly to half. This can accordingly reduce the required vertical dimensions of the front power transmission mechanism 114a and the rear power transmission mechanism 114b as a whole and allow the scanning optical device 48 to be compact. It is not necessary to deviate the front power transmission mechanism 114a and the rear power transmission mechanism 114b in the vertical direction. Hence, no imbalance is produced between the power transmission at the front side and the power transmission at the rear side, and they can be made substantially equal to each other.

Furthermore in the scanning optical device 48, notches 148a and 148b for facilitating the provisional wire anchorage are provided adjacent to the input wire drums 116a and 116b. Accordingly, after the wires 126a and 126b have been wound around the input wire drums 116a and 116b through a plurality of turns, the wires can be provisionally anchored by a very simple operation, and the wrapping of the wires 126a and 126b can be carried out highly efficiently without any likelihood of accidentally loosening the wires 126a and 126b off the wire drums 116a and 116b around which they have once been wrapped.

Figure 9:
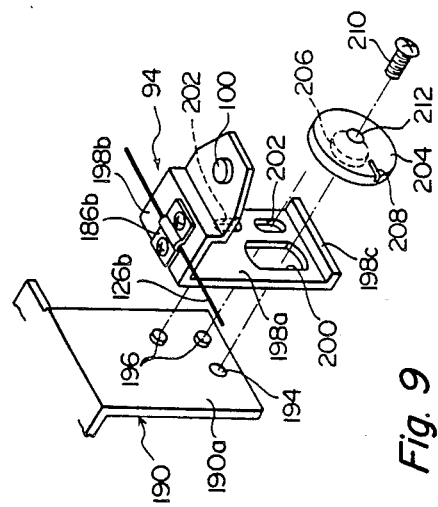
FIG. 9 is an exploded perspective view showing the rear end portion of the first optical element assembly shown in FIG. 8.

Now, with reference to FIGS. 8 and 9, the manner of mounting the support member 94 on the supporting frame 90 in the first optical element assembly 54 will be described. In the illustrated embodiment, a nearly L-shaped securing plate 190 is fixed by a securing screw 192 to the rear end portion of the supporting frame 90 extending in the front-rear direction. One end portion 190a of the securing plate 190 extends downwardly. An internally threaded hole 194 is formed in end portion 190a and a pair of vertically spaced protrusions 196 are provided in the end portion 190a. The support member 94 is also nearly L-shaped and has a downwardly extending portion 198a and a rearwardly extending support portion 198b. An elongate hole 200 having a relatively large width and a pair of elongate holes 202 having a relatively small width are formed in the downwardly extending portion 198a. As shown in FIGS. 8 and 9, the sliding piece 100 and the wire fixing piece 186b are secured to the support portion 198b of the support member 94. Associated with the support member 94, is a position adjusting means for adjusting the relative position of the supporting frame 90 and the support member 94. The illustrated position adjusting means is provided with a circular plate cam 204. A circular protrusion 206 is provided eccentrically at the rear surface of the circular plate cam 204, and a depressed portion 208 is formed in the peripheral edge portion of the circular plate cam 204.

The circular plate cam 204 and the support member 94 are mounted on the securing plate 190 in the following manner. First, the protrusion 206 of the circular plate cam 204 is positioned in the long hole 200 in the support member 94 so that its position can be adjusted vertically. Then, the pair of protrusions 196 on the securing plate 190 are positioned in the pair of elongate holes 202 in the support member 94 so that they are free to move vertically. Thereafter, a screw member 210 constituting locking means is fitted in the internally threaded screw hole 194 of the securing plate 190 through a through-hole 212 formed in the circular plate cam 204. As a result, the support member 94 and the circular plate cam 204 are secured to the supporting frame 90 via the securing plate 190 and the screw member 210. When the screw member 210 is loosened in the above-described mounted state, the circular plate cam 204 becomes rotatable and the support member 94 becomes free to move vertically from a position (for example, the position shown in FIG. 10-B) at which the protrusion 196 abuts support member 94 at one end of the elongate hole 202 to a position at which the protrusion 196 abuts support member 94 at the other end of the elongate hole 202.

With reference to FIGS. 8, 10-A and 10-B, to change the position of the rear end portion of the first reflecting mirror 52 to an upper or lower position from the position shown in FIG. 10-A or, in other words, to correct the supporting of the supporting frame 90 rearwardly in a downwardly or upwardly inclined fashion by the guiding members 82 and 84, it is first necessary to loosen the screw member 210. Then, the circular plate cam 204 is turned to cause its large-diameter acting portion 204a (or small-diameter acting portion 204b) to act on an acting protrusion 198c provided at the lower end of the downwardly extending portion 198a of the support member 94 (the action of the small-diameter portion 204b is not shown). As a result, since the support portion 198b of the support member 94 is supported on the rail portion 88a of the guiding rail 88, the supporting frame 90 is moved upwardly (or downwardly) relative to the support member 94, and thus the rear end portion of the first reflecting mirror 52 is moved upwardly (or downwardly) as contemplated. The turning of the circular plate cam 204 can be easily effected by, for example, fitting the end portion of a tool such as a screw driver into the depressed portion 208 formed on the surface of the cam 204. This depressed portion 208 also functions as a mark for showing the angular position of the circular plate cam 204. It will be understood from FIGS. 10-A and 10-B that during the above-described movement, the protrusions 196 on the securing plate 190 move within the elongate holes 202 upwardly (or downwardly), and the protrusion 206 of the circular plate cam 204 also moves within the elongate hole 200 upwardly (or downwardly). Thereafter, the loosened screw member 210 is tightened to fix the securing plate 190, the circular plate cam 204 and the support member 94 in a predetermined position.

The following should be noted with respect to the first optical element assembly 54. By turning the circular plate cam 204, the vertical position of the securing plate 190 or the supporting frame 90 to the support member 94 is adjusted. Accordingly, even when the position of the rear end portion of the first reflecting mirror 52 is changed, the positional relation of the support member 94 to the guiding member 84 (guiding rail 88) remains unchanged, and only the positional relation of the securing plate 190 or the supporting frame 90 to the support member 94 changes. Accordingly, there is no effect on the wire 126b connected to the supporting member 94, nor is there any substantial adverse effect created by the adjustment of the vertical position of the first reflection mirror 52.

Figure 12:
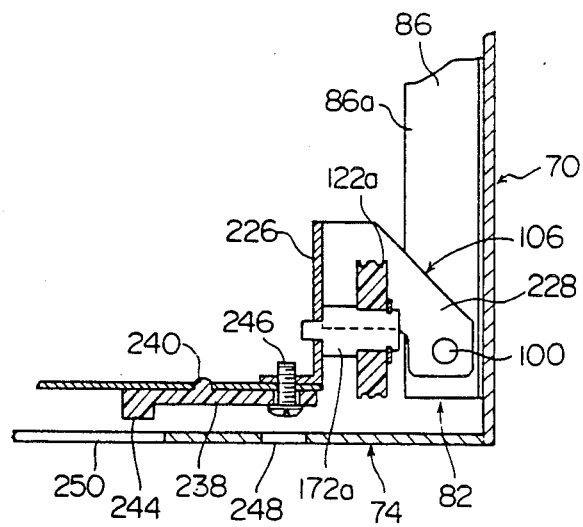
FIG. 12 is a sectional view showing one end portion of the second optical element assembly shown in FIG. 11 and its relative location in the electrostatic copying machine.

Now, with reference to FIGS. 11 to 12, the mounting of the supporting frame 104 and the support member 106 in the second optical element assembly 60 will be described. In the illustrated embodiment, the supporting frame 104 has a supporting plate 220 extending in the front-rear direction, and its upper and lower end portions are bent toward right top in FIG. 11, namely toward the first optical element assembly 54 (FIG. 3). A pair of vertically spaced elongate holes 222a and 222b are formed in the front end portion of the supporting plate 220. The elongate holes 222a and 222b extend vertically. An elongate hole 224 extending longitudinally of the supporting plate 220 is formed inwardly of that site of the supporting plate 220 at which the elongate hole 222a is formed. On the other hand, the support member 106 has a substantially perpendicularly extending upstanding wall portion 226 and a nearly triangular projecting portion 228 extending forwardly from the upstanding wall portion 226. A securing wall portion 230 is also provided at one side end of the upstanding wall portion 226. An internally threaded hole 232 is formed in the upper part of the securing wall portion 230, and a cylindrical short protrusion 234 is formed in its lower part. It will be easily understood from FIGS. 3 and 11 that the pulley 122a is rotatably mounted on the short rod 172a extending in the upstanding wall portion 226, and an anchoring member 236 is anchored in the front end portion of the short rod 172a to prevent detachment of the pulley 122a. The sliding member 100 is fixed to the forward end part of the projecting portion 228. In association with the supporting member 106, position adjusting means is further provided for adjusting the relative position of the supporting frame 104 and the support member 106. The position adjusting means is provided with a manually operable adjusting lever 238. A supporting protrusion 240 is integrally provided nearly centrally in the adjusting lever 238, and a circular hole 242 is formed in one end thereof. At the other end portion of the adjusting lever 238, an operating protrusion 244 is provided.

The support member 106 and the adjusting lever 238 are mounted on the supporting plate 220 in the following manner. First, the short protrusion 234 formed in the securing wall portion 230 of the support member 106 is positioned within the elongate hole 222b formed in the supporting plate 220. Then, the supporting protrusion 240 provided in the adjusting lever 238 is positioned within the elongate hole 224 formed in the supporting plate 220 (this operation may be carried out before the mounting of the support member 106). Thereafter, the hole 242 formed in the adjusting lever 238, the elongate hole 222a formed in the supporting plate 220 and the internally threaded hole 232 formed in the support member 106 are aligned properly, and the fixing screw 246 acting as locking means is threadedly fitted into the internally threaded hole 232 through the hole 242 and the elongate hole 222a. As a result, the adjusting lever 238, the supporting plate 220 and the support member 106 are fixed together by the fixing screw 246. It will be understood from FIGS. 11 and 13 that the support member 106 is free to move vertically relative to the supporting plate 220 between a position at which the short protrusion 234 abuts supporting plate 220 at one end of the elongate hole 222b (the fixing screw 246 abuts supporting plate 220 at one end of the elongate hole 222a) and a position at which the short protrusion 234 abuts supporting plate 220 at the other end of the elongate hole 222b (the fixing screw 246 abuts supporting plate 220 at the other end of the elongate hole 222a). When the fixing screw 246 is loosened, the adjusting lever 238 is free to pivot between an angular position at which the fixing screw 246 abuts supporting plate 220 at one end of the elongate hole 222a and an angular position at which the fixing screw 246 abuts supporting plate 220 at the other end of the elongate hole 222a.

Figure 13:
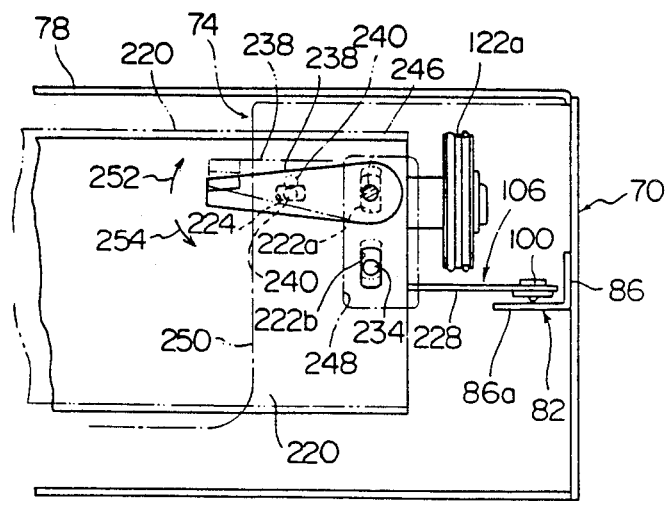
FIG. 13 is a left side view showing one end portion of the second optical element assembly and its relative location in the electrostatic copying machine.

With reference mainly to FIGS. 11 and 13, in order to change the positions of the front end portions of the second reflecting mirror 56 and the third reflecting mirror 58 to upper or lower positions, or in other words, to correct the deviation of the right end portion (the right end portion in the width-wise direction) of the copied document on a copy sheet in a forwardly or rearwardly inclined fashion as compared with its left end portion (the left end portion in the width-wise direction), it is first necessary to loosen the fixing screw 246 through the opening 248 formed in the supporting plate 74 (see FIG. 2 also). Then, the adjusting lever 238 is slightly pivoted upwardly as shown by an arrow 252 (or downwardly as shown by an arrow 254) as indicated by a two-dot chain line in FIG. 13 through the notch 250 formed in the supporting plate 74. As a result, since the fixing screw 246 constituting the center of pivoting of the adjusting lever 238 is threadedly fitted in the internally threaded hole 232 of the support member 106 through the elongate hole 222a, the action of the supporting protrusion 240 moves the supporting plate 220 upwardly (or downwardly) as shown by a two-dot chain line in FIG. 13 due to the pivoting of the adjusting lever 238. Consequently, the front end portions of the second reflecting mirror 56 and the third reflecting mirror 58 mounted on the supporting frame 104 are also moved upwardly (or downwardly). As can be understood from FIGS. 11 and 13, during this movement, the short protrusion 234 and the fixing screw 246 in the support member 106 move relatively downwardly (or upwardly) within the elongate holes 222a and 222b, and the supporting protrusion 240 of the adjusting lever 238 moves relatively to the left (or to the right) within the elongate hole 224. Then, the fixing screw 246 is fixed through the opening 248 of the supporting plate 74. Consequently, the adjusting lever 238, the supporting plate 220 and the support member 106 are fixed, and the supporting plate 220 and the support member 106 are maintained in an adjusted positional relation.

The following should be noted with regard to the second optical element assembly 60. By operating the adjusting lever 238, the vertical position of the supporting plate 220 or the supporting frame 104 with respect to the support member 106 is adjusted. Accordingly, even when the positions of the front end portions of the second reflecting mirror 56 and the third reflecting mirror 58 are changed, the positional relation of the guiding member 82 (guiding rail 86) and the support member 106 remains substantially unchanged, and only the positional relation of the supporting plate 190, i.e. the supporting frame 104, to the support member 106 changes. Thus, the vertical position of the pulley 122a mounted on the support member 106 does not substantially change. Hence, substantially no adverse effect on the wire is created. For example, there is no substantial deleterious effect such as a vertically deviating tendency on the first optical element assembly 54 via the wire 126a due to the position adjustment of the supporting plate 220.

Figure 14:
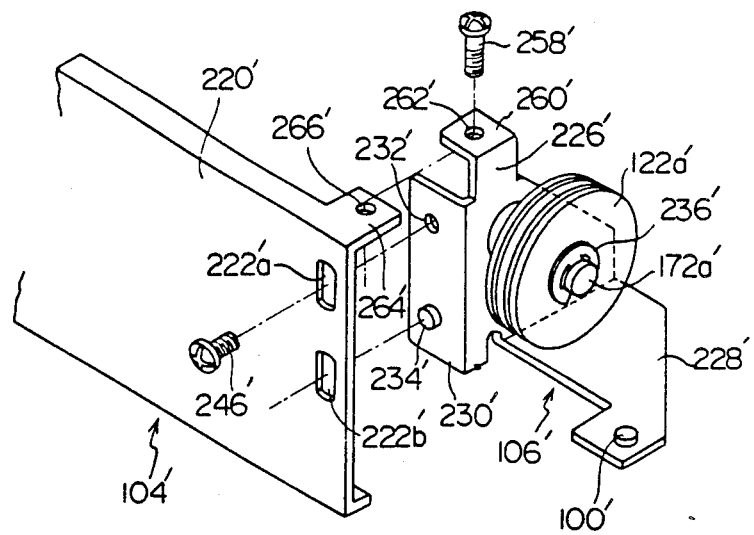
FIG. 14 is an exploded perspective view showing one end portion of a modified example of the second optical element assembly.
Figure 15:
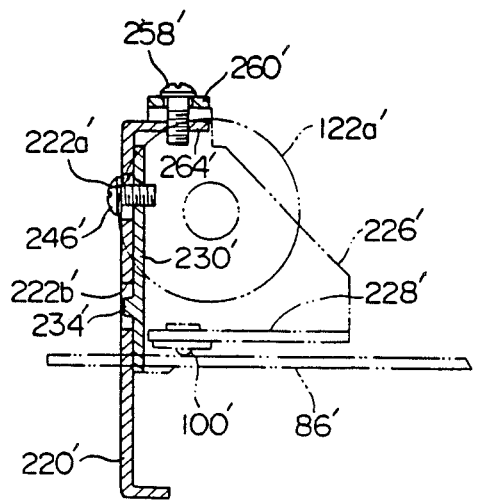
FIG. 15 is a sectional view showing one end portion of the second optical element assembly shown in FIG. 14.

FIGS. 14 and 15 show a modified example of the second optical element assembly 60.

With reference to FIG. 14, the position adjusting means in this modified example is provided with an adjusting screw 258' in place of the adjusting lever. In this connection, an inwardly extending projecting piece 260' is integrally provided at the upper end of the upstanding wall portion 226 of the support member 106'. A hole 262' is formed in the projecting piece 260'. A projecting piece 264' extending toward right top in FIG. 14 and toward the above projecting piece 260' is integrally provided at the upper end of one end portion of the supporting plate 220'. The adjusting screw 258' is threadingly fitted in the internally threaded hole 266' of the supporting plate 220' through the hole 262' of the support member 106'. The structure of the remainder of the modified example is substantially the same as the embodiment shown in FIG. 13.

As can be easily understood from FIG. 15, when the fixing screw 246' is loosened, the support member 106' becomes free to move vertically relative to the supporting plate 220' between a position at which the short protrusion 234' abuts the supporting plate 220' at one end of the elongate hole 222b ' (the fixing screw 246' abuts the supporting plate 220' at one end of the elongate hole 222a' ) and a position at which the short protrusion 234' abuts the supporting plate 220' at the other end of the elongate hole 222b' (the fixing screw 246' abuts the supporting plate 220' at the other end of the elongate hole 222a' ). When the adjusting screw 258' is turned in a predetermined direction (or in a direction opposite to it) in the loosened state, the supporting plate 220' and therefore the supporting frame 104' are moved upwardly (or downwardly) with respect to the support member 106' supported on the guiding member 86', and consequently, as in the embodiment shown in FIGS. 1 to 13, the vertical positions of the second reflecting mirror and the third reflecting mirror mounted on the second optical element assembly can be adjusted as required.

While the invention has been described in detail with respect to the specific embodiments of the scanning optical device, it should be understood that the invention is not limited to these specific embodiments, and various changes and modifications are possible without departing from the scope of the invention.

For example, in the illustrated embodiment, the position adjusting means is provided at the rear end portion of the first optical element assembly 54 (in other words, the position of the support member can be adjusted with respect to the supporting frame). This is not limitative, and the position adjusting means may be provided at the front end portion of the first optical element assembly 54, or at both end portions of the first optical element assembly 54. The position adjusting means may be of the type shown in FIGS. 11 to 13, or of the type shown in FIGS. 14 and 15.

In the illustrated embodiment, the position adjusting means is provided at the front end portion of the second optical element assembly 60. But this is not limitative, and it may be provided at the rear end portion of the second optical element assembly 60, or at both end portions of the second optical element assembly 60. The position adjusting means may be of the types shown in FIGS. 8 to 10.

Furthermore, in the illustrated embodiment, the invention has been described with reference to a scanning optical device in an electrostatic copying machine. But the invention may also be applied to a scanning optical device of other image-forming machines or an image reader device such as a facsmile device for reading a transmitted document.

We claim:

1. A scanning optical device comprising a first optical element assembly having front and rear sides; a second optical element assembly having front and rear sides, said assemblies mounted in said device so as to be reciprocally movable therein; and driving means for reciprocating said first and said second optical element assemblies, said driving means including a front side power transmission mechanism having a plurality of pulleys and a wire wrapped around the pulleys, said front side power transmission mechanism drivingly connected to said first and said second optical element assemblies at the front sides thereof, a rear side power transmission mechanism including a plurality of pulleys and a wire wrapped around the pulleys of said rear side power transmission mechanism, said rear side power transmission mechanism drivingly connected to said first and said second optical element assemblies at the rear sides thereof, and a common driving source drivingly connected to said front and said rear side power transmission mechanisms, said front and said rear side power transmission mechanisms including respective input wire drums rotatably mounted in the device about respective nearly vertically extending central axes, the common driving source drivingly connected to each of said output wire drums, and said wires being respectively wrapped around said input wire drums a plurality of turns in said front and said rear power transmission mechanisms.

2. The scanning optical device of claim 1 and further comprising front and rear side upstanding base plates spaced apart from one another in a width-wise direction of the device, and a supporting plate disposed between said front and said rear upstanding base plates at one end of the device, and wherein said common driving source, the input wire drum of said front side power transmission mechanism and the input wire drum of said rear side power transmission mechanism are mounted on the supporting plate.

3. The scanning optical device of claim 2, wherein said common driving source is mounted on said supporting plate centrally in the width-wise direction, and the input wire drum of said front side power transmission mechanism and the input wire drum of said rear side power transmission mechanism are mounted, respectively, to the front side and to the rear side of said common driving source.

4. The scanning optical device of claim 2 wherein said supporting plate has notches formed therein adjacent the input wire drum of said front side power transmission mechanism and the input wire drum of said rear side power transmission mechanism, respectively, for allowing said wires to be provisionally anchored therein to said supporting plate during assembly of the device.

5. The scanning optical device of claim 4, wherein each of said notches has two leg portions spaced from each other and extending nearly parallel to each other and a connecting portion open to and extending between one end of one leg portion and one end of the other leg portion, a respective anchoring projection piece extending toward said connecting portion from the other ends of the two leg portions as defined between the leg portions of each of said notches.

6. The scanning optical device of claim 1 wherein said common driving source has a rotating output shaft whose central axis extends nearly vertically.

7. A scanning optical device comprising a first optical element assembly and a second optical element assembly which are mounted in the device so as to be reciprocally movable therein; driving means for reciprocating said first and said second optical element assemblies, said driving means including a power transmission mechanism having an input wire drum, a plurality of pulleys and a wire wrapped around the input wire drum a plurality of turns and also around said pulleys and, said power transmission mechanism drivingly connected to said first and said second optical element assemblies, and a driving source drivingly connected to said power transmission mechanism; and a plate member having a notch formed therein adjacent said input wire drum of the power transmission mechanism for allowing said wire to be provisionally anchored therein to said plate member during assembly of the device.

8. The scanning optical device of claim 7, wherein the notch has two leg portions spaced from each other and extending nearly parallel to each other and a connecting portion open to and extending between one end of one leg portion and one end portion of the other leg portion, an anchoring projecting piece extending toward said connecting portion from the other ends of the two leg portions as defined between the leg portions of said notch.

9. The scanning optical device of claim 7, wherein said plate member is a supporting plate on which said input wire drum is mounted.

10. An optical scanning device comprising a pair of supporting means spaced apart in a width-wise direction in the device; an optical element assembly mounted to said pair of supporting means so as to be reciprocally movable along said supporting means, said assembly including a supporting frame having opposite end portions, optical elements mounted to said frame, and support portions provided on said end portions of said supporting frame and respectively supported by said pair of supporting means; power transmission means connected to at least one of said support portions for reciprocating said optical element assembly along said pair of supporting means; and position adjusting means including an adjusting lever pivotally mounted to said supporting frame and connecting at least one of said support portions to said supporting frame for adjusting the position of said supporting frame substantially vertically relative to the at least one of said support portions which is connected to said supporting frame by said adjusting means.

11. An optical scanning device comprising a front side upstanding base plate and a rear side upstanding base plate spaced apart in a width-wise direction of the device so as to define a space therebetween; a first optical element assembly having a front and a rear side; a second optical element assembly having a front and a rear side, said assemblies disposed in said space defined between said base plates and mounted in said device so as to be reciprocally movable therein; and driving means connected to said optical element assemblies for reciprocating said assemblies in the device, said driving means including a front side power transmission mechanism having a plurality of pulleys and a wire wrapped about said pulleys, said front side power transmission mechanism drivingly connected to said first and said second optical assemblies at the front sides thereof, a rear side power transmission mechanism having a plurality of pulleys and a wire wrapped about the pulleys of the rear side transmission mechanism, said rear side transmission mechanism drivingly connected to said first and said second optical assemblies at the rear sides thereof, and a common drive source drivingly connected to said front and said rear side power transmission mechanisms, said front and said rear side transmission mechanisms and said common driving source of said driving means being disposed in said space defined between said front and said rear side upstanding base plates, and said front and said rear side power transmission mechanisms including respective input wire drums each of which drums is mounted in the device so as to rotate freely about a respective central axis extending nearly vertically, said common driving source being drivingly connected to each of said input wire drums, and said wires being respectively wrapped around said input wire drums a plurality of turns in said front and said rear side power transmission mechanisms.

12. The scanning optical device of claim 11, wherein a supporting plate is disposed between said front and said rear side upstanding base plates at one end of the device, and said common driving source, the input wire drum of said front side power transmission mechanism and the input wire drum of rear side power transmission mechanism are mounted on said supporting plate.

13. The scanning optical device of claim 12, wherein said common driving source is mounted on said supporting plate centrally in the width-wise direction, and the input wire drum of said front side power transmission mechanism and the input wire drum of said rear side power transmission mechanism are mounted, respectively, to the front side and to the rear side of said common driving source.

14. The scanning optical device of claim 12, wherein said supporting plate has notches formed therein adjacent the input wire drum of said front side power transmission mechanism and the input wire drum of said rear side power transmission mechanism, respectively, for allowing said wires to be provisionally anchored therein to said supporting plate during assembly of the device.

15. The scanning optical device of claim 14, wherein each of said notches has two leg portions spaced from each other and extending nearly parallel to each other and a connecting portion open to and extending between one end of one leg portion and one end of the other leg portion, a respective anchoring projecting piece extending toward said connecting portion from the other ends of the two leg portions as defined between the leg portions of each of said notches.

16. The scanning optical device of claim 11, wherein said common driving source has a rotating output shaft whose central axis extends nearly vertically.

* * * * *

UNITED STATES PATENT AND TRADEMARK OFFICE
CERTIFICATE OF CORRECTION

PATENT NO. : 4,931,836

DATED : June 5, 1990

INVENTOR(S) : Tetsuya MATSUSHITA et al.

It is certified that error appears in the above-identified patent and that said Letters Patent is hereby corrected as shown below:

Column 17, line 67, "output" has been changed to --input--.

Signed and Sealed this

Thirty-first Day of December, 1991

Attest:

HARRY F. MANBECK, JR.

Attesting Officer        Commissioner of Patents and Trademarks